June 9, 1953 — H. J. MORAN — 2,641,424
VARIABLE DIAMETER PARACHUTE CANOPY
Filed April 5, 1950 — 2 Sheets-Sheet 2

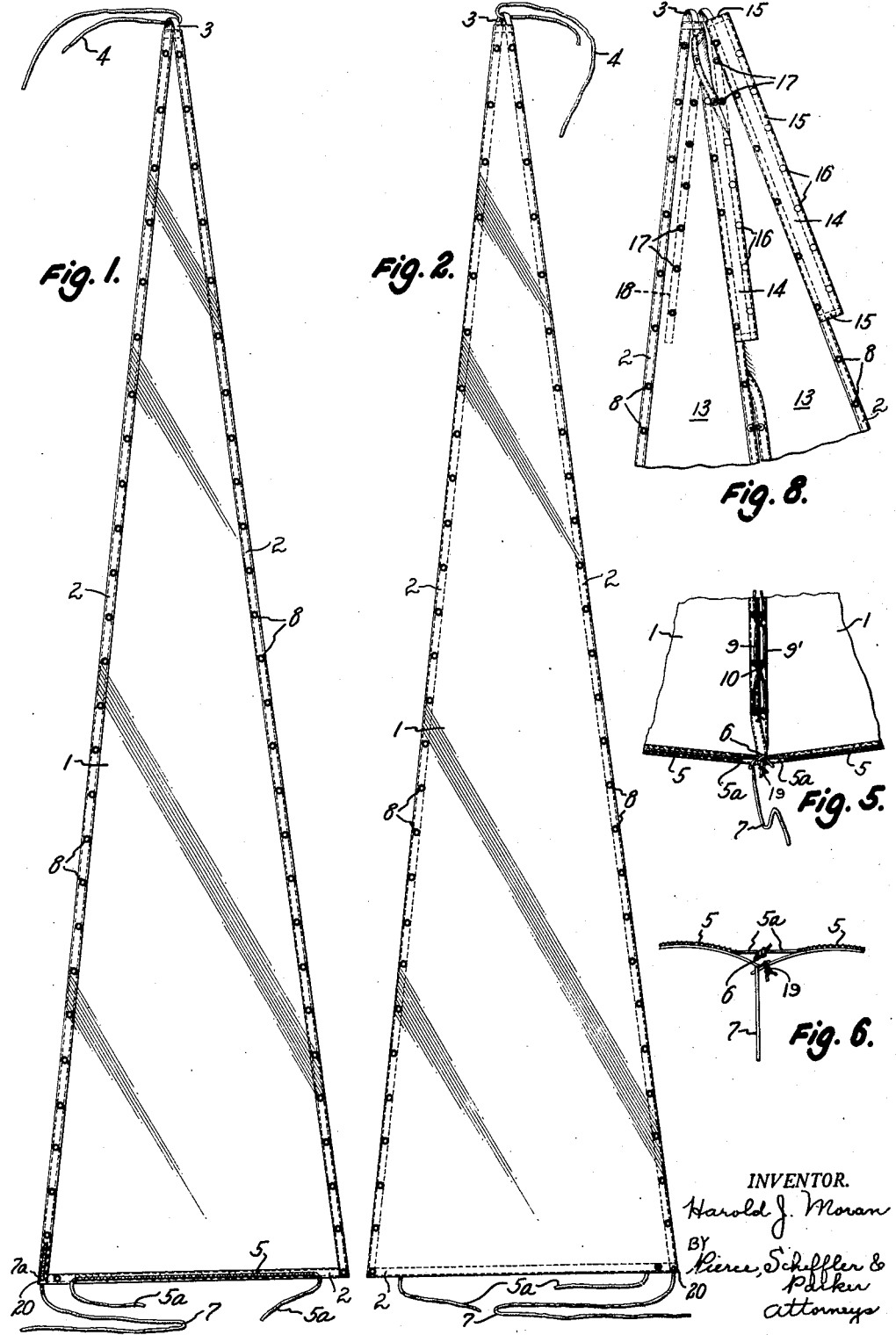

INVENTOR.
Harold J. Moran
BY
Pierre Scheffler & Parke
Attorneys

Patented June 9, 1953

2,641,424

UNITED STATES PATENT OFFICE 2,641,424

VARIABLE DIAMETER PARACHUTE CANOPY

Harold J. Moran, West Pittston, Pa., assignor to Mead Aviation Equipment Company, Trenton, N. J., a corporation of New Jersey Application April 5, 1950, Serial No. 154,011

12 Claims. (Cl. 244—145)

The present invention relates to parachutes and in particular to an improved construction for a parachute canopy.

A principal object of the invention is to provide a parachute canopy that can be easily and quickly assembled from a plurality of panels, the several panels being joined together along the side seams thereof by readily detachable interconnecting means spaced along the seams as distinguished from the conventional practice of sewing the panels permanently together.

One important advantage inherent in the improved construction lies in the fact that the panels may easily be added to or subtracted from the canopy to vary the diameter thereof to meet any desired load requirement.

Another important advantage of the new construction is that it simplifies the problem of repair. Any damaged panel can be easily and quickly replaced and repair of the damaged one is obviously simplified since the worker is not obliged to handle the entire canopy as is now necessary where all panels of the canopy are sewn permanently together. Now that modern current parachute needs require canopies up to and over 200 feet in diameter, it is with this in mind I find this design quite suitable to simplify and ease manufacturing and rigging parachute canopies with the volume and bulk found in 200 foot diameter canopy assemblies and their like.

Still another advantage is that the spaced points of interconnection between panels give rise to air vents extending longitudinally along the side hems thereof which decrease the shock load on the canopy when the latter first opens.

The foregoing objects and advantages will become more apparent from the following detailed description and the accompanying drawings which illustrate a preferred embodiment of the invention.

In the drawings:

Figs. 1 and 2 are plan views of the outer and under sides, respectively, of one of the plurality of triangular gores which when interconnected together form the complete canopy;

Figs. 3–5 are fragmentary sections of the outer and under sides of the gores showing the manner in which adjacent gores are interconnected along the side hems;

Fig. 6 is a detail illustrating the manner in which adjacent gores are tied together along the base hem;

Fig. 8 is a fragmentary section of a modified construction incorporating porosity flaps adjacent the apex of each gore.

Figure 3:
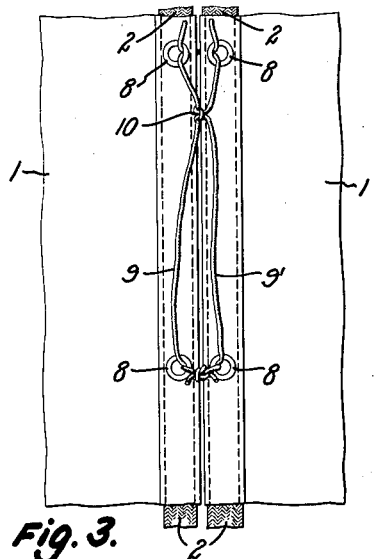

Referring now to the drawings, the several panels from which the complete parachute canopy is assembled are all alike, and, as clearly shown in Figs. 1–2, are each preferably comprised of a triangularly shaped piece 1 of parachute cloth. Each of the gores 1 is hemmed along all three edges and a reinforcing strip of tape 2 is stitched into the hem. A loop 3 which may be formed from the same tape material used along the sides of the gore is sewn onto each gore at the apex thereof. When all gores have been assembled, a circumventing cord 4 is passed through all of the loops 3 and tied in order to secure all of the gores together at their apices.

As shown in Figs. 5–6, each of the gores 1 is also provided with a skirt bridle cord 5 stitched onto the outer side of the gore along the bottom hem. The cord 5 is free at each end 5a and the ends of adjacent cords on adjacent gores are tied together at 6. Each gore is also provided with a suspension line 7 extending below the base hem at one corner. The canopy end 7a of line 7 is passed through an aperture 20 in the base hem and tape 2 from the inner side of the gore and is stitched onto the outer side of the gore along one of the side hems for a distance sufficient to withstand its share of the load to be dropped by the parachute. This is a precautionary measure to prevent line 7 from pulling away from the gore and ripping the threads.

To enable the several gores to be connected together, each gore is provided with a plurality of evenly spaced eyelets 8 extending along the sides thereof to receive lacing cords. The eyelet edges may be reinforced with button hole stitching or the eyelets may be constituted by grommets applied in the usual manner.

Figure 4:
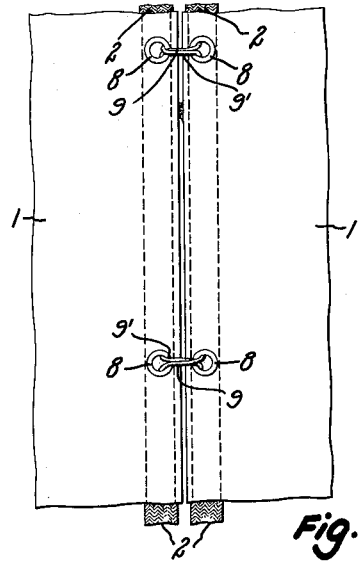

Figs. 3 and 4 illustrate one manner of lacing adjacent gores together to form the complete canopy. Beginning at one end of the gore, two lacing cords 9, 9' are passed through each pair of adjacently disposed eyelets 8 in succession and the two cords 9, 9' are preferably knotted together at each pair of eyelets as at 10 before being led to the next pair of eyelets. Knots 10 may be tied close to the eyelets in order to keep the edges of adjacent gores very close together at the eyelet points, or as illustrated the knots may be made a short distance below the eyelets in order to allow a limited amount of separation of adjacent gores throughout their length and thereby increase the venting action between the gores. Knotting of the lacing cords at each pair of eyelets has the additional advantage of preventing adjacent gores from becoming unlaced should one or both of the cords break at any particular point along the lacing. As shown in Figs. 5 and 6, lacing cords 9, 9' terminate at the first pair of eyelets above the bottom hem, and the eyelets at the lower corner of each gore are preferably tied tightly in overlapped manner by means of a short cord knotted at 19.

Figure 7:
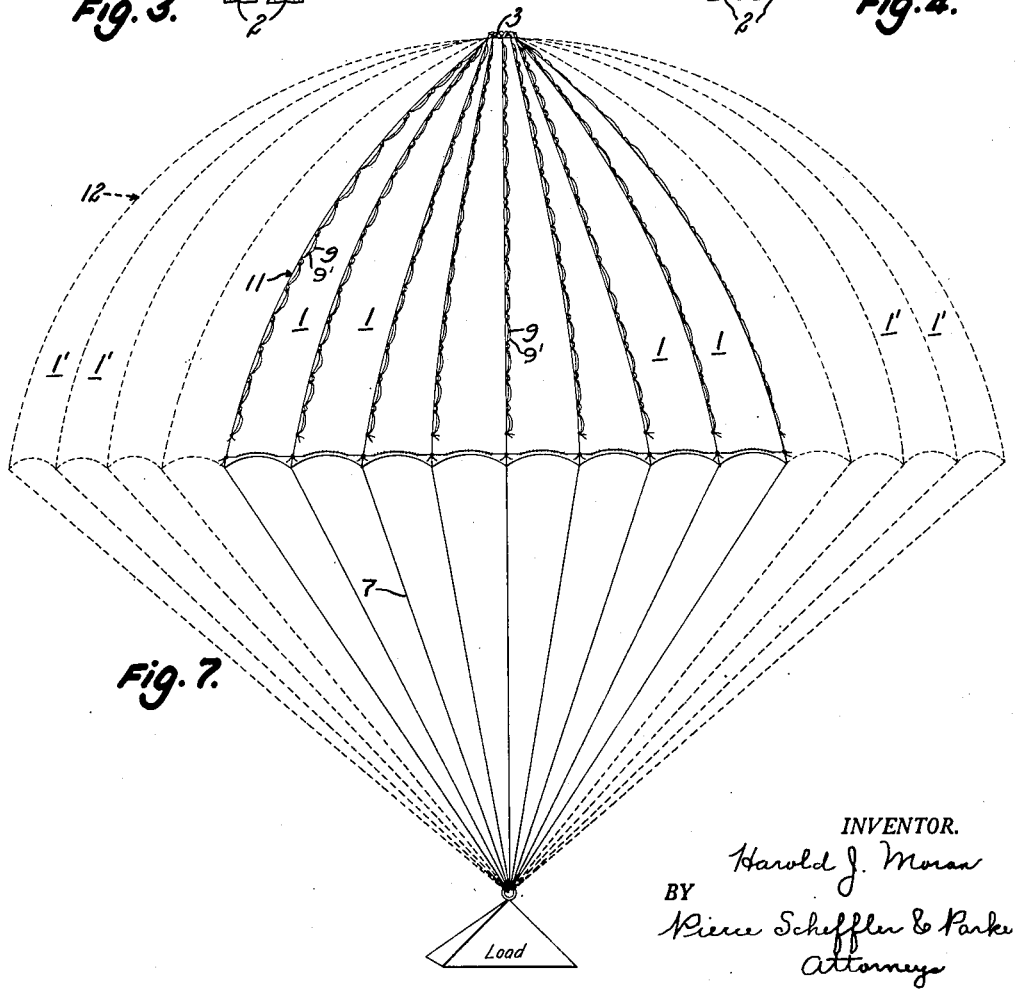
Fig. 7 is a view of the assembled canopy when fully open in load lowering position.

As explained at the outset, one of the principal advantages inherent in making the gores readily detachable is that any desired number of the triangular gores may be easily assembled to form a canopy of any required load capacity. Adding gores of course enlarges the canopy and subtracting gores has the opposite effect. Two possibilities are illustrated in Fig. 7. Canopy 11 shown in full lines has a comparatively small number of gores 1 and presents a generally conical appearance when inflated; the other canopy 12 of higher load capacity superimposed upon canopy 11 for purposes of comparison and shown in broken lines has a much larger number of gores 1' and is substantially hemispherical when inflated.

Venting of the canopy to cushion the shock load upon opening takes place through the apex ends of the gores and also between each pair of gores along the laced sides. Venting also takes place through the gore material in the same manner and for the same purpose as in conventional parachute construction.

Should the material used for the gores 1 have a very high porosity characteristic, it may be desirable to decrease the porosity of the canopy in the vicinity of the apex in order to insure proper opening, and Fig. 8 illustrates one practical arrangement for producing the result desired. The construction of the gores 13 is identical with that of gores 1, except that each of the gores 13 is provided with a rectangularly shaped porosity flap 14 stitched onto one side of the gore along one of the side hems and which extends laterally from the latter adjacent the apex. The edges of flap 14 are provided with hemmed in tape strips 15 to reinforce the same. When all gores have been assembled, the porosity flap of each gore will overlap a portion of like area on the adjacent gore thereby providing a plurality of canopy sections of double thickness adjacent the apex which of course decrease the canopy porosity accordingly. Conventional snap fasteners are preferred for holding down the flaps 14. The female elements 16 of such fasteners are located in spaced relation along the hem of the flap, and the male elements 17 are correspondingly placed on the gores. To reinforce the gore material at the location of the male elements 17, a strip of tape material 18 is preferably sewn onto the gore along the line of the fasteners.

The gores 13 in the modified construction of Fig. 8 can be laced together in edge-to-edge relation in the same manner as the gores 1, or if desired, those portions of the hems along the side edges from the lower side of the porosity flap to the apex can be overlapped and retained in such relation by a "lock-stitch" type of lacing at each pair of aligned eyelets similar to the lock-stitching made by sewing machines.

In conclusion, while I have described a preferred constructional embodiment for my improved parachute canopy it will be understood that such construction is typical only of the inventive principles involved. For example in lieu of the eyelets and lacing cords, other readily detachable means such as snap fasteners, hooks and eyes, and the like may be used to interconnect adjacent gores of the canopy without however departing from the spirit and scope of the invention as defined by the appended claims.

I claim:

1. A parachute canopy comprising a plurality of interchangeable gores arranged in side-by-side relation, said gores being identical in size, and readily detachable lacing means connecting the side edge of each gore to the adjacent side edge of an adjoining gore whereby the load capacity of the parachute may be varied by changing the number of gores that make up the canopy.

2. A parachute canopy comprising a plurality of interchangeable gores of like size arranged in side-by-side relation, the side edges of said gores having spaced eyelets therealong, and a lacing cord extending through the eyelets in adjacent edges of adjoining gores and detachably interlacing said gores together whereby the load capacity of the parachute may be varied by changing the number of gores that make up the canopy.

3. A parachute canopy as defined in claim 2 and wherein each said gore further includes a skirt bridle cord extending across and beyond the ends of the base portion of the gore, the adjoining end portions of the bridle cords on adjacent gores being connected together thereby to reinforce the base portion of the canopy.

4. A parachute canopy as defined in claim 3 and wherein each said gore further includes a suspension line depending from the base of each said gore.

5. A parachute canopy comprising a plurality of gores arranged in side-by-side relation, readily detachable means interconnecting the adjacent side edges of adjoining gores, a porosity flap secured to and extending laterally from a side edge of each gore adjacent the apex thereof so as to overlap a portion of the adjoining gore, and means for fastening each said flap upon the overlapped portion of the adjoining gore.

6. A parachute canopy as defined in claim 5 wherein the fastening means for said flaps comprises pairs of male and female snap fastener elements secured respectively to said flap and gore.

7. A parachute canopy comprising a plurality of interchangeable gores of like size arranged in side-by-side relation, readily detachable means interconnecting the side edges of adjoining gores, means forming a loop at the apex of each said gore, and a cord loop extending through the several loops for tying the latter together whereby the load capacity of the parachute may be varied by changing the number of gores that make up the canopy.

8. A parachute canopy comprising a plurality of interchangeable gores of like size arranged in side-by-side relation, spaced eyelets along the side edges of each gore, a pair of cords extending through correspondingly positioned eyelets in adjacent edges of adjoining gores and detachably lacing said edges together, means forming a loop at the apex of each gore, a cord loop extending through the several loops and tying the latter together, a skirt bridle cord extending across and beyond the ends of the base portion of each gore, the adjoining end portions of the bridle cords on adjacent gores being tied together, and a suspension cord secured to and depending from each gore in alignment with one side edge thereof whereby the load capacity of the parachute may be varied by changing the number of gores that make up the canopy.

9. A parachute canopy as defined in claim 8 wherein each pair of said lacing cords is knotted together between successive pairs of interlaced eyelets.

10. A parachute canopy comprising a plurality of gores arranged in side-by-side relation, said gores being interchangeable and of like size, and readily detachable means interconnecting the adjacent side edges of adjoining gores whereby the load capacity of the parachute may be varied by changing the number of gores that make up the canopy.

11. A parachute canopy comprising a plurality of gores arranged in side-by-side relation, said gores being interchangeable and of like size, and readily detachable connecting means spaced along the side edges of adjoining gores and interconnecting the same whereby the load capacity of the parachute may be varied by changing the number of gores that make up the canopy.

12. A parachute canopy comprising; a plurality of interchangeable gores of like size arranged in side-by-side relation, each said gore including a skirt bridle cord secured along the base edge thereof and extending beyond the junctions of the base with the two side edges, the adjoining end portions of the bridle cords on adjacent gores being connected together thereby to reinforce the base portion of the canopy, a suspension line secured to and depending from the base edge in alignment with one of the side edges, and a loop at the apex thereof; a cord member extending through the loops of the said plurality of gores for interconnecting the apices of the gores; and readily detachable means interconnecting the adjacent side edges of adjoining gores whereby the load capacity of the parachute may be varied by changing the number of gores that make up the canopy.

HAROLD J. MORAN.

References Cited in the file of this patent

UNITED STATES PATENTS

| Number | Name | Date |
| --- | --- | --- |
| 700,520 | Lundquist | May 20, 1902 |
| 836,226 | Turner | Nov. 20, 1906 |
| 1,137,541 | Schweinburg | Apr. 27, 1915 |
| 1,273,553 | Upson | July 23, 1918 |
| 1,328,425 | Duffey | Jan. 20, 1920 |
| 1,521,315 | Pease | Dec. 30, 1924 |
| 2,089,140 | Tricau | Aug. 3, 1937 |
| 2,356,493 | Smith | Aug. 22, 1944 |
| 2,358,798 | Forbes | Sept. 26, 1944 |
| 2,501,670 | Fogal | Mar. 28, 1950 |